US009262862B2

(12) United States Patent
Tsai et al.

(10) Patent No.: US 9,262,862 B2
(45) Date of Patent: Feb. 16, 2016

(54) METHOD AND APPARATUS FOR RECONSTRUCTING THREE DIMENSIONAL MODEL

(71) Applicant: Industrial Technology Research Institute, Hsinchu (TW)

(72) Inventors: Yao-Yang Tsai, Kaohsiung (TW); Hian-Kun Tenn, Kaosiung (TW); Jay Huang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 430 days.

(21) Appl. No.: 13/686,927

(22) Filed: Nov. 28, 2012

(65) Prior Publication Data

US 2014/0099017 A1 Apr. 10, 2014

(30) Foreign Application Priority Data

Oct. 4, 2012 (TW) ............... 101136721 A

(51) Int. Cl.
*G06T 17/00* (2006.01)
*G06T 7/00* (2006.01)

(52) U.S. Cl.
CPC .............. *G06T 17/00* (2013.01); *G06T 7/0077* (2013.01); *G06T 7/0081* (2013.01); *G06T 2200/08* (2013.01); *G06T 2207/10028* (2013.01)

(58) Field of Classification Search
None
See application file for complete search history.

(56) References Cited

U.S. PATENT DOCUMENTS

| 6,249,600 B1 | 6/2001 | Reed et al. |
| 6,754,370 B1 | 6/2004 | Hall-Holt et al. |

(Continued)

FOREIGN PATENT DOCUMENTS

| CN | 101894383 | 11/2010 |
| TW | M364920 | 9/2009 |
| TW | 201223248 | 6/2012 |

OTHER PUBLICATIONS

Chang, Will, and Matthias Zwicker. "Global registration of dynamic range scans for articulated model reconstruction." ACM Transactions on Graphics (TOG) 30.3 (2011): 26.*
Fitzpatrick, Richard. "Coordinate Transformations." Newtonian Dynamics. The University of Texas at Austin, Mar. 31, 2011. Web. Feb. 5, 2015.*

(Continued)

*Primary Examiner* — Chan Park
*Assistant Examiner* — Geoffrey E Summers
(74) *Attorney, Agent, or Firm* — Jianq Chyun IP Office

(57) ABSTRACT

A method and an apparatus for reconstructing a three dimensional model of an object are provided. The method includes the following steps. A plurality of first depth images of an object are obtained. According to a linking information of the object, the first depth images are divided into a plurality of depth image groups. The linking information records location information corresponding to a plurality of substructures of the object. Each depth image group includes a plurality of second depth images, and the substructures correspond to the second depth images. According to the second depth image and the location information corresponding to each substructure, a local module of each substructure is built. According to the linking information, the local models corresponding to the substructures are merged, and the three-dimensional model of the object is built.

18 Claims, 15 Drawing Sheets

(56) References Cited

U.S. PATENT DOCUMENTS

| | | | |
|---|---|---|---|
| 7,003,134 | B1 | 2/2006 | Covell et al. |
| 7,010,158 | B2 | 3/2006 | Cahill et al. |
| 7,158,656 | B2 | 1/2007 | Covell et al. |
| 7,184,071 | B2 | 2/2007 | Chellappa et al. |
| 7,450,736 | B2 | 11/2008 | Yang et al. |
| 7,590,262 | B2 | 9/2009 | Fujimura et al. |
| 7,860,301 | B2 | 12/2010 | Se et al. |
| 7,961,910 | B2 | 6/2011 | Lee et al. |
| 7,999,811 | B2 | 8/2011 | Liu et al. |
| 8,009,867 | B2 | 8/2011 | Mathe et al. |
| 8,208,717 | B2 | 6/2012 | Xiao et al. |
| 8,610,723 | B2 * | 12/2013 | Lee et al. .................. 345/473 |
| 8,639,020 | B1 * | 1/2014 | Kutliroff et al. ............. 382/154 |
| 2003/0038801 | A1 * | 2/2003 | Terauchi et al. ............. 345/420 |
| 2003/0063085 | A1 * | 4/2003 | Leow et al. .................. 345/420 |
| 2009/0175540 | A1 | 7/2009 | Dariush et al. |
| 2010/0034457 | A1 * | 2/2010 | Berliner ............ G06K 9/00362 382/154 |
| 2010/0194872 | A1 * | 8/2010 | Mathe ............... G06K 9/00335 348/77 |
| 2010/0197390 | A1 * | 8/2010 | Craig ................ G06K 9/00369 463/30 |
| 2010/0259546 | A1 | 10/2010 | Yomdin et al. |
| 2011/0181591 | A1 * | 7/2011 | Benitez et al. ............... 345/426 |
| 2011/0210915 | A1 | 9/2011 | Shotton et al. |
| 2011/0293137 | A1 * | 12/2011 | Gurman et al. ............... 382/103 |
| 2012/0147004 | A1 | 6/2012 | Choi et al. |
| 2013/0100119 | A1 * | 4/2013 | Evertt et al. .................. 345/419 |
| 2013/0187919 | A1 * | 7/2013 | Medioni ................ G06T 17/00 345/420 |
| 2013/0286012 | A1 * | 10/2013 | Medioni ................ G06T 17/00 345/420 |
| 2014/0225988 | A1 * | 8/2014 | Poropat .......................... 348/46 |

OTHER PUBLICATIONS

Rutishauser, Martin, Markus Stricker, and Marjan Trobina. "Merging range images of arbitrarily shaped objects." Computer Vision and Pattern Recognition, 1994. Proceedings CVPR'94., 1994 IEEE Computer Society Conference on. IEEE, 1994.*

Weisstein, Eric W. "Point-Plane Distance." From MathWorld—A Wolfram Web Resource. http://mathworld.wolfram.com/Point-PlaneDistance.html.*

Tong, Jing, et al. "Scanning 3d full human bodies using kinects." Visualization and Computer Graphics, IEEE Transactions on 18.4 (2012): 643-650.*

Allen et al., "Articulated Body Deformation from Range Scan Data," Proceedings of ACM SIGGRAPH 2002 21(3), Jul. 2002, pp. 612-619.

Pekelny et al., "Articulated Object Reconstruction and Markerless Motion Capture from Depth Video," Eurographics 2008 27(2), Apr. 2008, pp. 399-408.

Tong et al., "Scanning 3D Full Human Bodies Using Kinects," IEEE Transactions on Visualization and Computer Graphics 18(4), Apr. 2012, pp. 643-650.

Chang et al., "Global Registration of Dynamic Range Scans for Articulated Model Reconstruction," ACM Transactions on Graphics 30(3), May 2011, Article 26, pp. 26:1-26:15.

Baran et al., "Automatic Rigging and Animation of 3D Characters," Proceedings of ACM SIGGRAPH 2007 26(3), Jul. 2007, pp. 1-8.

Shotton et al., "Real-Time Human Pose Recognition in Parts from a Single Depth Image", 2011 IEEE Conference on Computer Vision and Pattern Recognition (CVPR) Jun. 20-25, 2011, pp. 1297-1304.

"Notice of Allowance of Taiwan Counterpart Application", issued on Oct. 29, 2014, p. 1-p. 4.

* cited by examiner

METHOD AND APPARATUS FOR RECONSTRUCTING THREE DIMENSIONAL MODEL

CROSS-REFERENCE TO RELATED APPLICATION

This application claims the priority benefit of Taiwan application serial no. 101136721, filed on Oct. 4, 2012. The entirety of the above-mentioned patent application is hereby incorporated by reference herein and made a part of this specification.

TECHNICAL FIELD

The technical field relates to a method and an apparatus for reconstructing a three-dimensional model.

BACKGROUND

A three-dimensional (3D) model scanning technique is mainly used to obtain 3D information of an object, and reconstruct a 3D model on an electronic device capable of performing computations such as a computer or a handheld device, etc. Compared to a model produced by an art staff by using model edit software (for example, Maya or 3DMax), not only an appearance of the 3D model has a higher fidelity, but also it has less fabrication time and low manpower demand.

The existing 3D model scanning technique mainly includes two core steps of "shooting" and "merging" images of an object. For example, in the "shooting" step, a shooting angle of the object has to cover all possible angles as far as possible in order to guarantee integrity of a final result. After the "shooting" step is completed, the "merging" step is executed to merge images captured in different angles into a 3D model. In the two core steps, the "merging" step is generally the most difficult step, and the largest difference in the existing techniques also lies in such step.

For example, one of the existing techniques is to use a single camera to obtain shooting results of different time points, and calculate correlation of the shooting results according to a feature corresponding relationship of overlapped parts of the shooting results, so as to merge the shooting results to build a 3D model of the object. Alternatively, another existing technique is to use a single camera and a turntable to record a rotating angle of a turntable corresponding to a shooting moment, and merge the shooting results of each angle obtained by the turntable, so to build the 3D model of the object. Moreover, another existing technique is to erect a plurality of cameras to cover all of the shooting angles, and simultaneously obtain shooting results of the object. Since positions of the cameras are all fixed, as long as a position and a shooting direction of each camera are obtained, shooting data of the cameras can be merged to build the 3D model of the object.

However, in the above existing techniques, since the single camera shoots the object at different time points, if an appearance of the object changes during the shooting period, the reconstructed model of the object is incomplete (for example, structure misalignment caused by change of the structure). Moreover, if a plurality of cameras are used to simultaneously shoot the object, the required cost is higher than the cost of using the single camera, which is difficult to be accepted by ordinary users.

Therefore, it is an important problem to be resolved by manufactures to accurately reconstruct a 3D model of a deformable object.

SUMMARY

The disclosure is directed to a method and an apparatus for reconstructing a three-dimensional (3D) model, by which a 3D model of a deformable object is capable of being accurately reconstructed.

An embodiment of the disclosure provides a method for reconstructing a three-dimensional (3D) model, which is adapted to build a 3D model of an object. The method for reconstructing the 3D model includes following steps. A plurality of first depth images of an object are obtained. The first depth images of the object are divided into a plurality of depth image groups according to linking information of the object, where the linking information records location information corresponding to a plurality of substructures of the object, each of the depth image groups comprises a plurality of second depth images, and each of the substructures corresponds to the second depth images of each of the depth image groups. A local model corresponding to each of the substructures is built according to the second depth images and the location information corresponding to each of the substructures. The local models corresponding to the substructures are merged according to the linking information of the object, so as to build the 3D model of the object.

An embodiment of the disclosure provides a 3D model reconstructing apparatus, which is adapted to build a 3D model of an object. The 3D model reconstructing apparatus includes an image capturing unit, a depth unit, an image grouping unit and a model building unit. The image capturing unit captures shooting information of the object in different angles to provide a plurality of shooting results. The depth unit is coupled to the image capturing unit, and builds a plurality of first depth images of the object according to the shooting results provided by the image capturing unit. The image grouping unit is coupled to the depth unit, and divides the first depth images of the object into a plurality of depth image groups according to linking information of the object, where the linking information records location information corresponding to a plurality of substructures of the object, each of the depth image groups comprises a plurality of second depth images, and each of the substructures corresponds to the second depth images of each of the depth image groups. The model building unit is coupled to the image grouping unit, and builds a local model corresponding to each of the substructures according to the second depth images and the location information corresponding to each of the substructures, and merges the local models corresponding to the substructures according to the linking information of the object, so as to build the 3D model of the object.

According to the above descriptions, the 3D model reconstructing apparatus divides the first depth images of the object into a plurality of depth image groups according to the linking information of the object, where each of the first depth image groups has a plurality of second depth images. Moreover, the 3D model reconstructing apparatus builds a plurality of the local models of the object according to the depth image groups, and merges the local models to build the integral 3D model of the object. In this way, the 3D image of the deformable object is accurately built.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
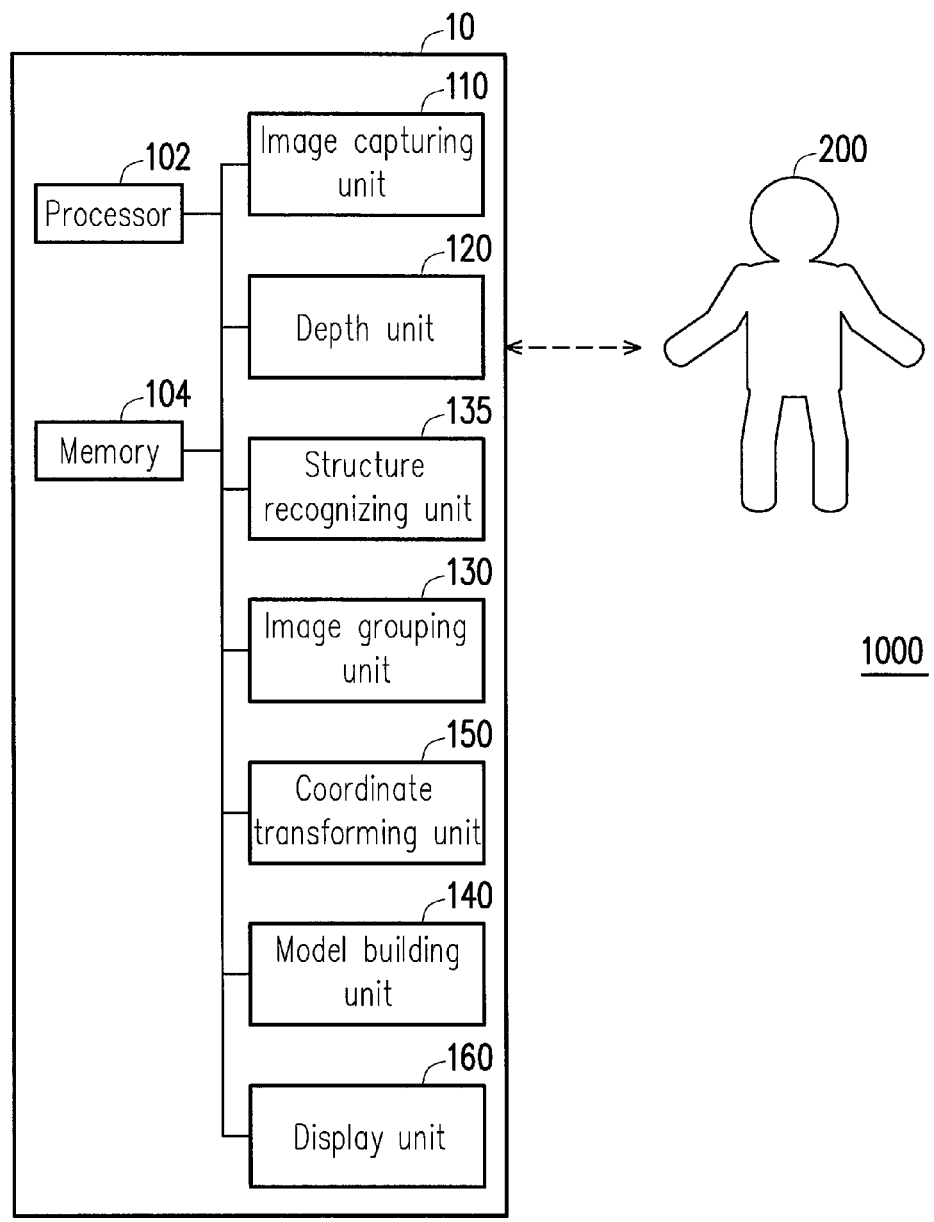
FIG. 1 is a block diagram of a three-dimensional (3D) model reconstructing apparatus system according to an exemplary embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a block diagram of a three-dimensional (3D) model reconstructing apparatus system according to an exemplary embodiment of the disclosure.

Referring to FIG. 1, the 3D model reconstructing apparatus system 1000 includes a 3D model reconstructing apparatus 10 and an object 200, where the 3D model reconstructing apparatus 10 is used to build a 3D model of the object 200. The 3D model reconstructing apparatus 10 is, for example, an electronic apparatus such as a notebook computer, a tablet PC, a personal digital assistant (PDA), a mobile phone, a digital camera, and e-book, or a game machine, etc., which is not limited by the disclosure. In the present exemplary embodiment, the 3D model reconstructing apparatus 10 includes a processor 102, a memory 104, an image capturing unit 110, a depth unit 120, and image grouping unit 130 and a model building unit 140. Moreover, the 3D model reconstructing apparatus 10 further includes a structure recognizing unit 135, a coordinate transforming unit 150 and a display unit 160. Functions of the above components are respectively described below.

The processor 102 can be hardware (for example, a chipset or a processor, etc.) having computation capability, which is used to control a whole operation of the 3D model reconstructing apparatus 10. In the present exemplary embodiment, the processor 102 is, for example, a central processing unit (CPU), or other programmable device, for example, a microprocessor, a digital signal processor (DSP), a programmable controller, an application specific integrated circuit (ASIC), a programmable logic device (PLD) or other similar devices.

The memory 104 is coupled to the processor 102. The memory 104 can be an internal storage unit or an external storage unit. The internal storage unit can be a random access memory (RAM), a read-only memory (ROM), a flash memory, a magnetic disk storage device, etc. The external storage unit can be a compact flash (CF), a memory card, a secure digital (SD) memory card, a micro SD memory card, or a memory stick (MS), etc., though the disclosure is not limited thereto. In the present exemplary embodiment, the memory 104 can be used to store image information of the object 200 or information required for building the 3D model of the object 200.

The image capturing unit 110 can be a video camera or a camera using a charge coupled device (CCD) lens, a complementary metal oxide semiconductor transistor (CMOS) lens or an infrared lens, though the disclosure is not limited thereto. The image capturing unit 110 is used to capture shooting information of the object 200 in different angles to provide a plurality of shooting results. Namely, regarding an object 200 capable of changing an action pattern thereof, within a shooting time that the image capturing unit 110 shoots the object 200, the image capturing unit 110 can capture different shooting results presented by the object 200 along a fixed or unfixed shooting direction when the object 200 conducts a dynamic motion to generate a motion pattern variation.

In detail, since the shooting direction of the image capturing unit 110 of the present exemplary embodiment is fixed or unfixed, when the object 200 conducts a dynamic motion, an angle between the object 200 and the image capturing unit 110 is varied along with the shooting time, such that the image capturing unit 110 can capture images of the object 200 that faces the image capturing unit 110 in different angles. The aforementioned shooting time is, for example, 30 seconds, and the image capturing unit 110, for example, captures an image of the object 200 every 0.03 seconds within the shooting time, namely, the image capturing unit 110 can obtain 1000 pieces of shooting information of the object 200 shot in different angles within the shooting time, though the disclosure is not limited thereto.

Figure 2A:
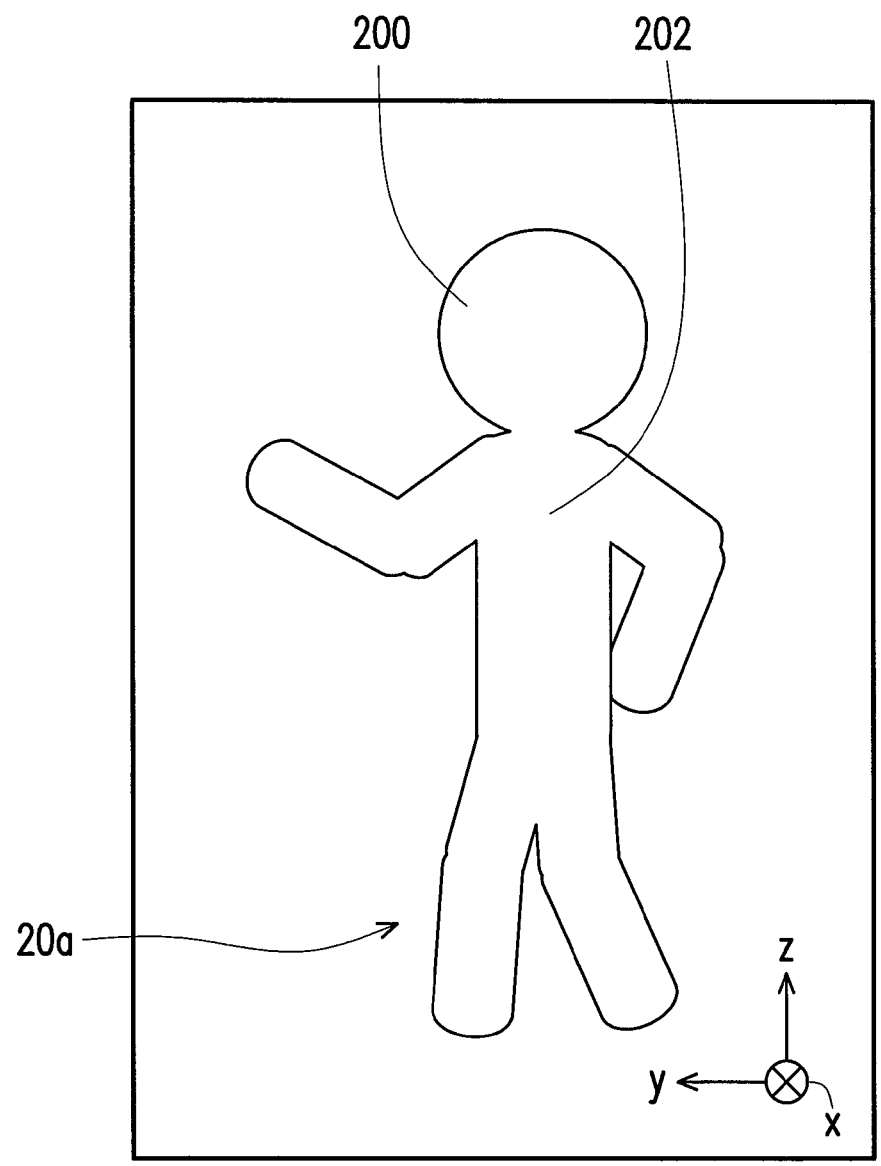
FIGS. 2A-2C are schematic diagrams of shooting results of an object obtained by an image capturing unit according to an exemplary embodiment of the disclosure.
Figure 2B:
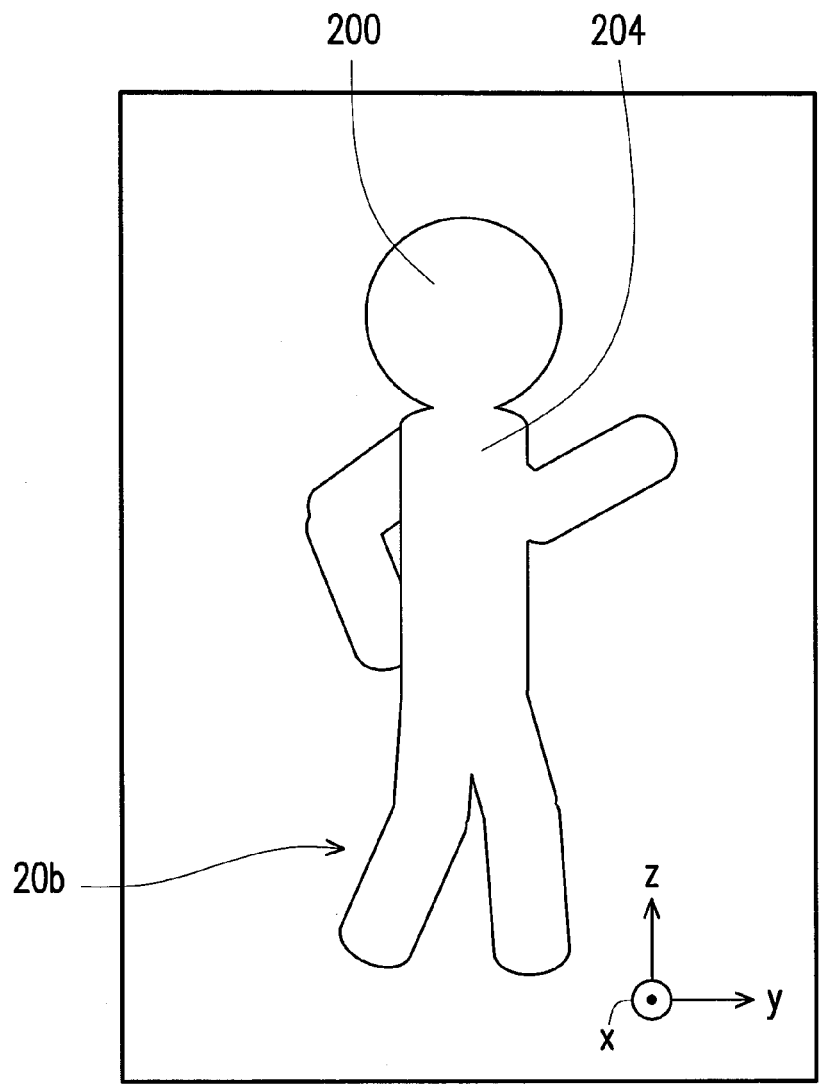
Figure 2C:
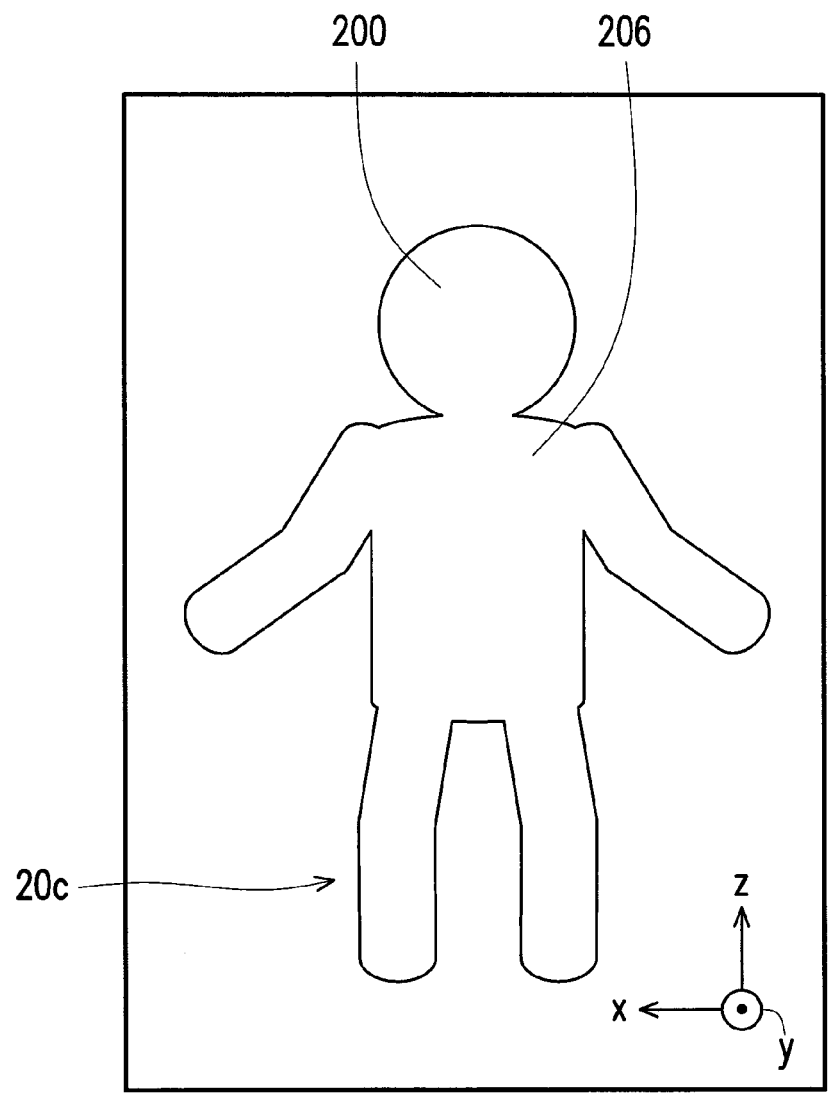

FIGS. 2A-2C are schematic diagrams of shooting results of the object 200 obtained by the image capturing unit 110 according to an exemplary embodiment of the disclosure. It is assumed that the object 200 shot by the image capturing unit 110 is a human body conducting a dynamic motion, and the image capturing unit 110 obtains three shooting results within the shooting time.

Referring to FIGS. 2A-2C, along with motion of the object 200, the image capturing unit 110 obtains a plurality of shooting results 20a, 20b and 20c of the object 200 in different angles. For example, the shooting result 20a shown in FIG. 2A corresponds to a profile 202 of the object 200, the shooting result 20b shown in FIG. 2B corresponds to another profile 204 of the object 200, and the shooting result 20c shown in FIG. 2C corresponding to a front side 202 of the object 200, where a y-direction represents a direction that the front side 206 of the object 200 faces to.

Figure 3A:
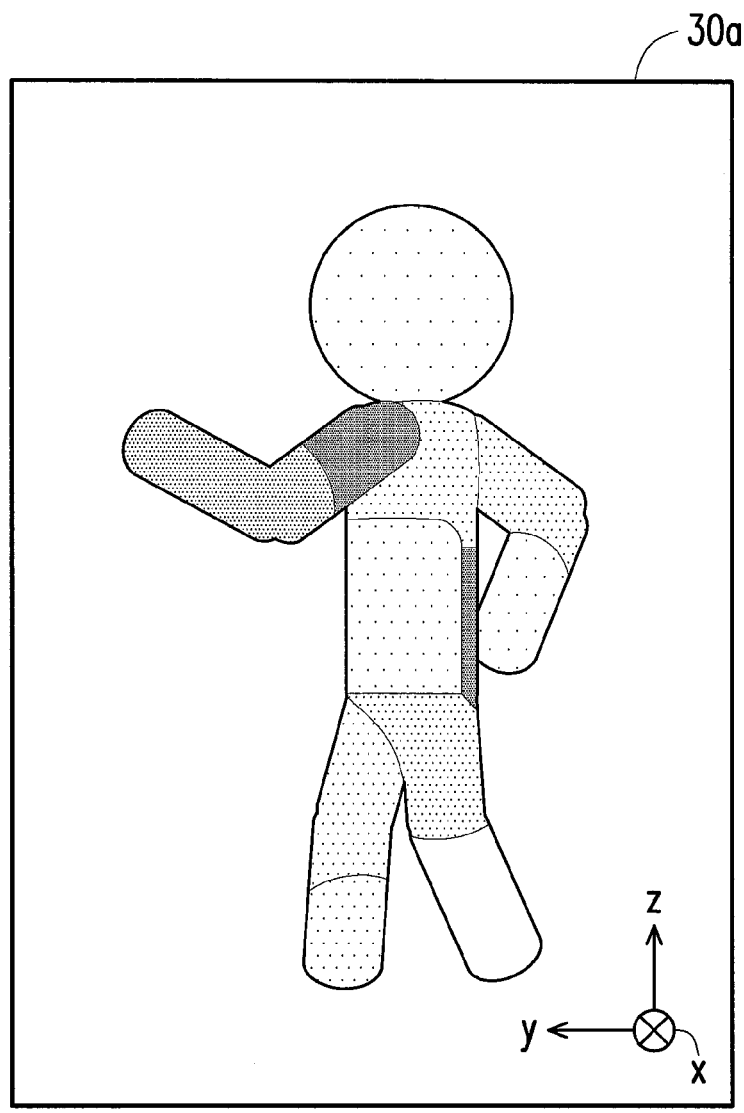
FIGS. 3A-3C are schematic diagrams of a plurality of first depth images of an object built by a depth unit according to an exemplary embodiment of the disclosure.
Figure 3B:
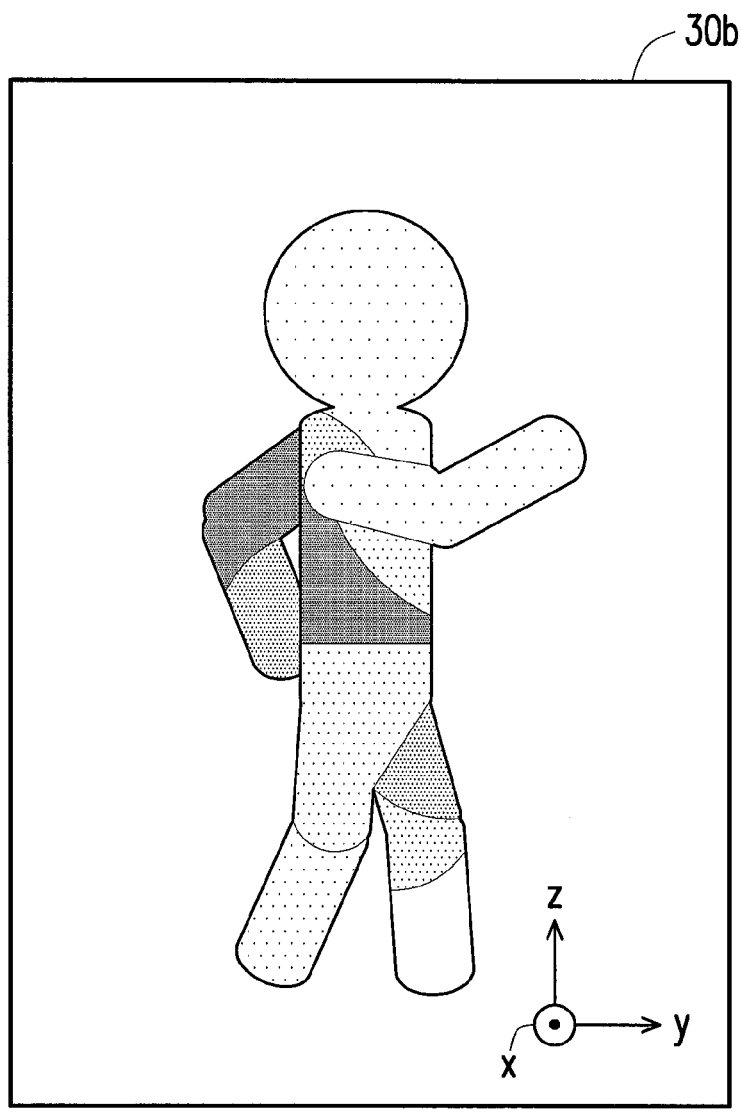
Figure 3C:
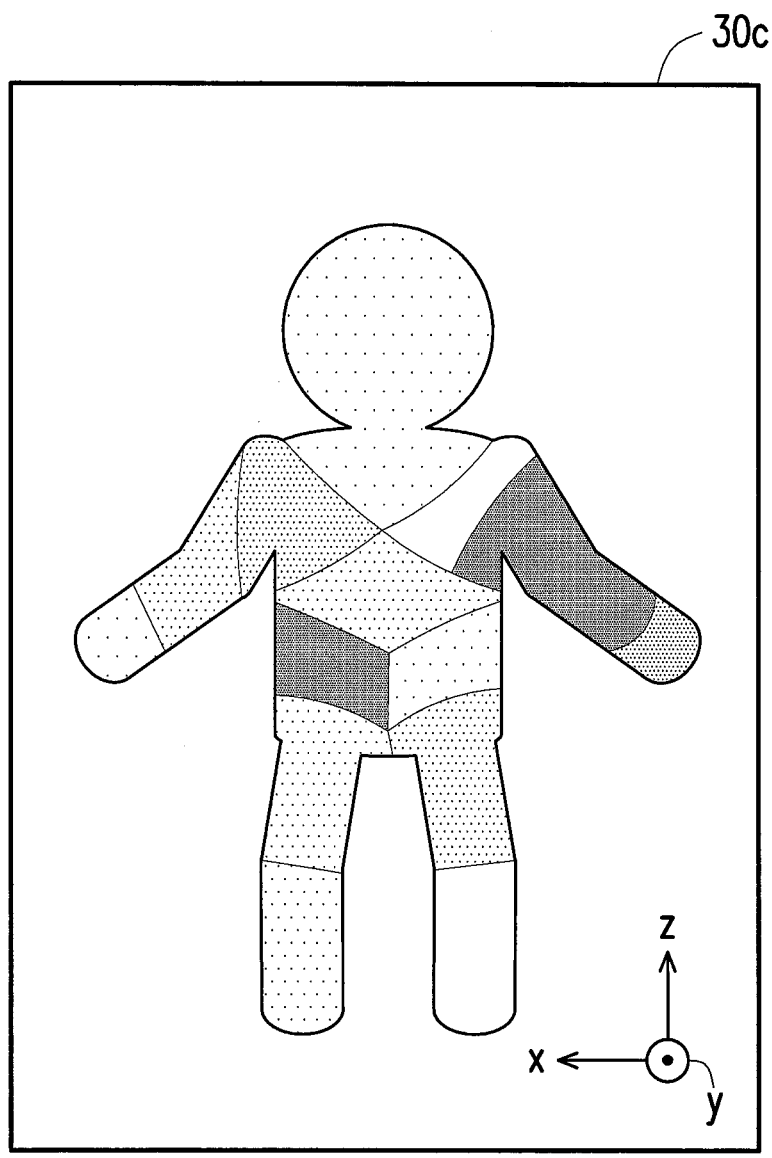

The depth unit 120 is coupled to the image capturing unit 110. The depth unit 120 builds a plurality of first depth images of the object 200 according to the shooting results provided by the image capturing unit 110, where the first depth image has depth information of the object 200. In detail, each of the first depth images has a plurality of pixels, where each pixel can be composed of three values (for example, floating-point numbers), which respectively represent a distance between a surface of the object 200 of each pixel and the image capturing unit 110. In other words, each of the first depth images can present position relationships between the object 200 and the image capturing unit 110 through the pixels, i.e. the so-called depth information of the object 200. Moreover, when each of the pixels in the first depth image is composed of three floating-point numbers, the first depth image may have the depth information of the object 200 with higher resolution. FIGS. 3A-3C are schematic diagrams of a plurality of first depth images of the object 200 built by the depth unit 120 according to an exemplary embodiment of the disclosure, where the depth unit 120 builds first depth images 30a, 30b and 30c of the object 200 according to the shooting results 20a, 20b and 20c provided by the image capturing unit 110. As shown in FIG. 3A, the first depth image 30a of the object 200 built by the depth unit 120 corresponds the shooting result 20a of the profile 202 of the object 200. As shown in FIG. 3B, the first depth image 30b of the object 200 built by the depth unit 120 corresponds the shooting result 20b of the profile 204 of the object 200. As shown in FIG. 3C, the first depth image 30c of the object 200 built by the depth unit 120 corresponds the shooting result 20c of the front side 206 of the object 200.

The image grouping unit 130 is coupled to the depth unit 120. The image grouping unit 130 divides the first depth images of the object 200 into a plurality of depth image groups according to linking information of the object 200, where the linking information records location information corresponding to a plurality of substructures of the object 200, each of the depth image groups comprises a plurality of second depth images, and each of the substructures corresponds to the second depth images of each of the depth image groups.

It should be noticed that the object 200 of the present exemplary embodiment may have a plurality of substructures, where each of the substructures is, for example, a local block of the object 200. Moreover, each of the substructures may have a plurality of microstructures, where each of the macrostructures can be regarded as a structure unit of the object 200 that cannot be further divided. Therefore, the linking information of the object 200 records a connection relationship of the substructures of the object 200 and records location information of the microstructures of each of the substructures.

According to another aspect, the object 200 of the present exemplary embodiment may have a global coordinate system, and the location information of each of the substructures on the global coordinate system is referred to as first coordinate information of the substructure, namely, the first coordinate information of each of the substructures is obtained according to the global coordinate system where the object 200 locates. Moreover, the location information of the microstructures of each of the substructures is also on such total coordinate system. In this way, since each of the substructures has the first coordinate information on the global coordinate system, the image grouping unit 130 can learn the connection relationship between the substructures according to the linking information, and a location of each of the substructures on the object 200 and location information thereof.

Figure 4:
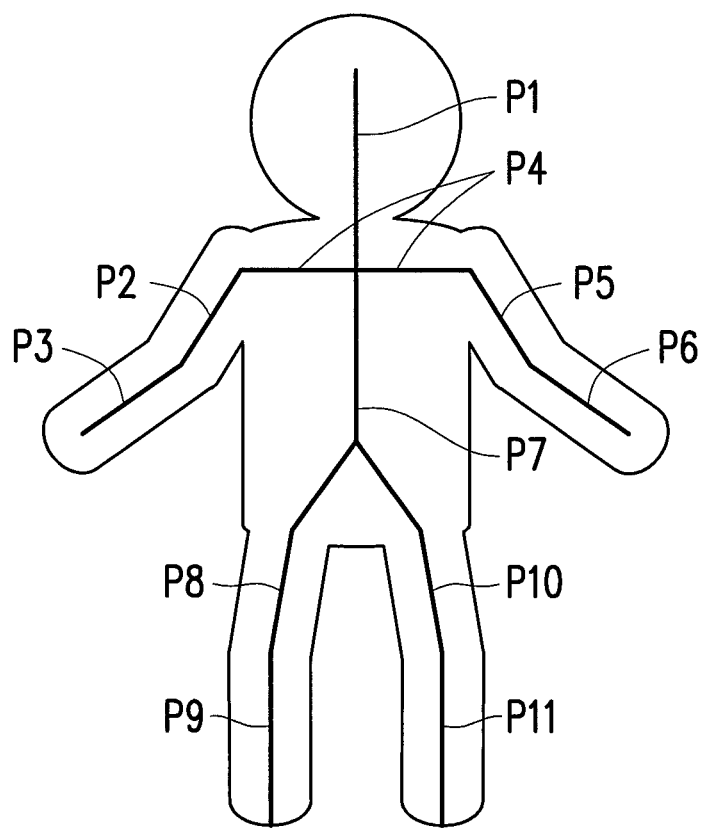
FIG. 4 is a schematic diagram of linking information of an object according to an exemplary embodiment of the disclosure.

FIG. 4 is a schematic diagram of the linking information of the object 200 according to an exemplary embodiment of the disclosure, where a situation that the object 200 is a human body is taken as an example to describe the linking information of the present exemplary embodiment. Referring to FIG. 4, the object 200 has substructures p1~p11, where the substructures p1-p11 have at least one or a plurality of microstructures p1-1~p1-N11, p2-1~p2-N2, . . . , p11-1~p11-N11, where N1~N11 are respectively positive integers. Moreover, each of the substructures p1~p11 can be regarded as a rigid body, namely, during a process that the image capturing unit 110 shoots the object 200, although the object 200 can conduct the dynamic motion, the microstructures p1-1~p1-N1, p2-1~p2-N2, . . . , p11-1~p11-N11 in the substructures p1~p11 may respectively have a same moving speed, namely, each of the substructures p1~p11 is regarded to have a single speed.

Here, the object 200 is, for example, the human body, and each of the substructures p1-p11 is, for example, a local skeleton structure of the human body, and the microstructures p1-1~p1-N1, p2-1~p2-N2, . . . , p11-1~p11-N11 in the substructures p1~p11, for example, corresponds to each bone of the human body (i.e. the aforementioned structure unit). In detail, each of the substructures p1~p11 is, for example, a skeleton structure of a head of the human body, a skeleton structure of a front arm or upper arm, a skeleton structure of a chest, a skeleton structure of an abdomen, or a skeleton structure of a thigh or lower leg, though the disclosure is not limited thereto. On the other hand, the substructure p3 is for example, the front arm, and the microstructures p3-1~p3-N3 of the substructure p3 are, for example, a radius bone, an ulna and a finger bone, etc. Namely, each of the substructures p1~p11 of the object 200 can be regarded as a local skeleton structure having a plurality of bones. Therefore, in the present exemplary embodiment, the linking information records location information of a part of the microstructures (for example, bones) in the object 200, so as to define the microstructures belonging to one substructure (for example, the local skeleton structure), and according to the local information of each of the microstructures, the linking information may also include the connection relationship between the substructures and the location information of each of the substructures in the object 200 (i.e. the global coordinate system of the object 200). In this way, the object 200 can be divided into the substructures p1~p11 according to the linking information.

It should be noticed that in the present exemplary embodiment, the structure recognizing unit 135 can be used to produce the substructures p1~p11 of the object 200, where the structure recognizing unit 135 can be respectively coupled to the image grouping unit 130 and the depth unit 120. Further, the structure recognizing unit 135 can recognize positions of each of the microstructures p1-1~p1-N1, . . . , p11-1~p11-N11 of the object 200 in each of the first depth images 30a, 30b and 30c according to a depth value of each pixel in the first depth images 30a, 30b and 30c of the object and the location information of the microstructures p1-1~p1-N1, . . . , p11-1~p11-N11 of the object 200, so as to recognize an appearance of the object 200 varied along with the time. The structure recognizing unit 135 can estimate the positions of the pixels corresponding to the microstructures p1-1~p1-N1, . . . , p11-1~p11-N11 of the object 200 according to positions of the pixels in the first depth images 30a, 30b and 30c. Therefore, the structure recognizing unit 135 can divide the substructures p1~p11 of the object 200 by calculating the corresponding relationship between the pixels and the microstructures p1-1~p1-N1, . . . , p11-1~p11-N11 in the first depth images 30a, 30b and 30c. In this way, the structure recognizing unit 135 can detect and track the appearance of the object 200 with a variable motion pattern by taking the microstructures p1-1~p1-N1, . . . , p11-1~p11-N11 as a sample and using the connection relationship between the substructures p1~p11 in the object 200.

For example, it is also assumed that the object 200 is the human body, if the pixel in the first depth images 30a, 30b and 30c is located at an edge of the first depth images 30a, 30b and 30c, the structure recognizing unit 135 recognizes that the pixel is located at an extremity of the four limbs. Alternatively, if the pixel in the first depth images 30a, 30b and 30c is located at a center area of the first depth images 30a, 30b and 30c, the structure recognizing unit 135 recognizes that the pixel is located at a torso portion of the object 200. Moreover, if the pixel in the first depth images 30a, 30b and 30c is located close to a region where the microstructures of the object 200 locate, the structure recognizing unit 135 recognizes that the pixel is located at a bone area of the object 200. In this way, according to the first depth images 30a, 30b and 30c of the object 200 and the location information of the microstructures p1-1~p1-N1, . . . , p11-1~p11-N11 of the object 200, the structure recognizing unit 135 can use the first depth images 30a, 30b and 30 to recognize the microstructures p1-1~p1-N1, . . . , p11-1~p11-N11 of the object 200, and track the appearance of the object 200. Therefore, the structure recognizing unit 135 can recognize the microstructures that have the same speed during the process that the image capturing unit 110 shoots the object 200, so as to find the substructures composed of the microstructures.

Moreover, the image grouping unit 130 divides each of the first depth images 30a, 30b and 30c of the object 200 into a plurality of second depth images according to the substructures p1~p11 of the object 200 and the depth values of the first depth images 30a, 30b and 30c, and takes the corresponding second depth images in the first depth images 30a, 30b and 30c as an image group, so as to divide depth image groups located at local blocks of each of the substructures p1~p11 of the object 200.

Figure 5A:
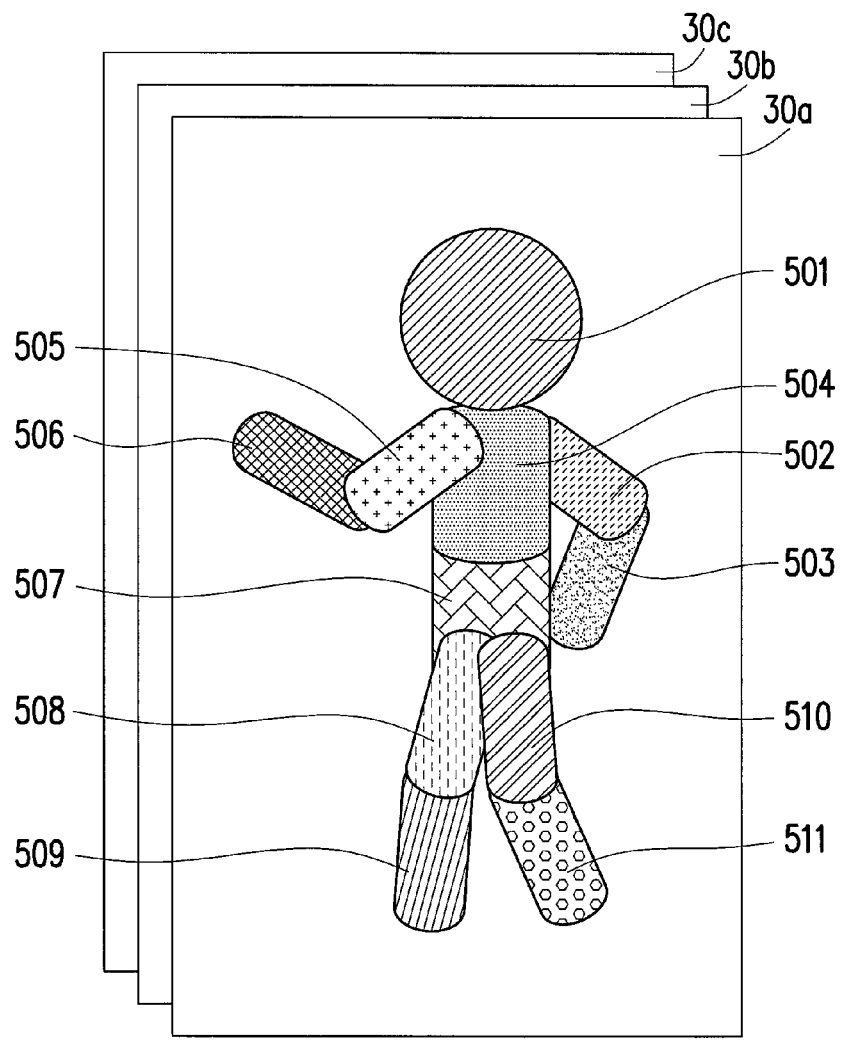
FIGS. 5A-5B are schematic diagrams of a situation that an image grouping unit divides first depth images of an object into a plurality of depth image groups according to an exemplary embodiment of the disclosure.
Figure 5B:
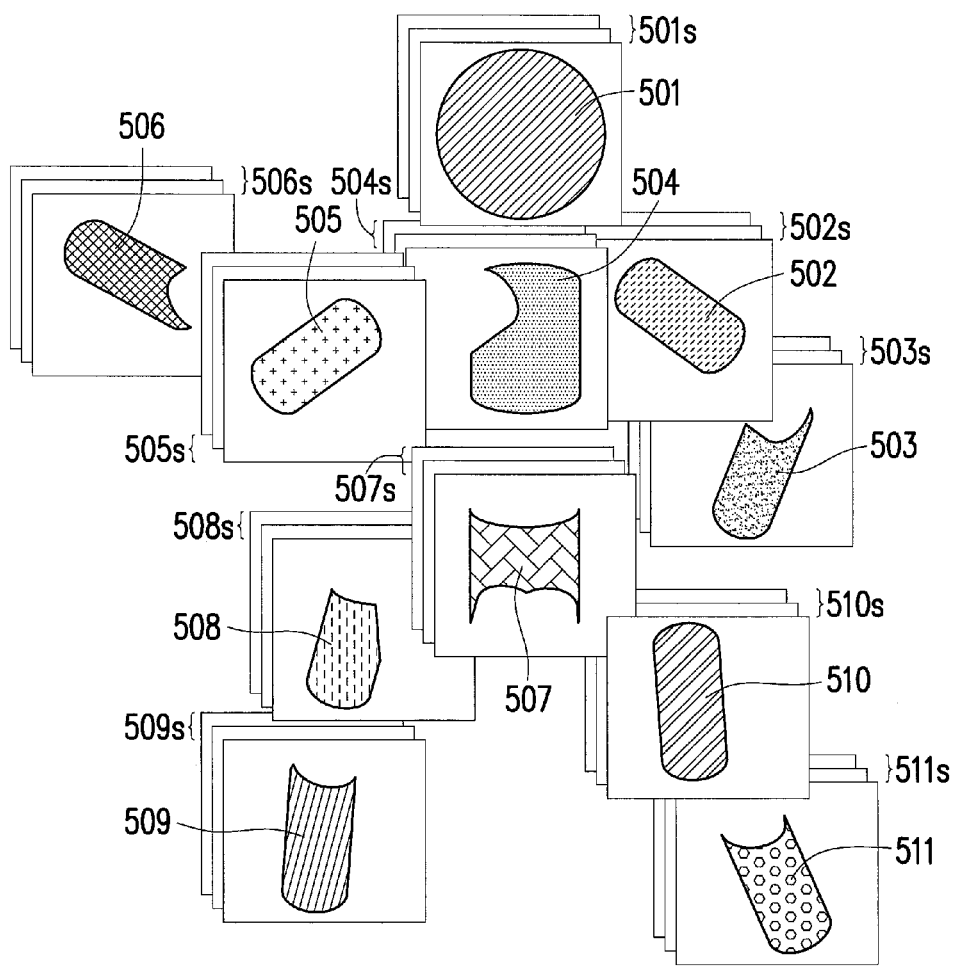

FIGS. 5A-5B are schematic diagrams of a situation that the image grouping unit 130 divides the first depth images of the object 200 into a plurality of depth image groups according to an exemplary embodiment of the disclosure, which are described below with reference of the first depth images 30a, 30b and 30c of FIGS. 3A-3B and the substructures of FIG. 4.

Referring to FIG. 5A and FIG. 5B, according to the linking information of the object 200, the image grouping unit 130 divides each of the first depth images 30a, 30b and 30c of the object 200 into a plurality of second depth images 501~511 according to the divided substructures p1~p11 of the object 200 and the depth values of the first depth images 30a, 30b and 30c, and takes the corresponding second depth images 501~511 in the first depth images 30a, 30b and 30c as an image group, so as to divide a plurality of depth image groups 501s~511s.

In detail, as shown in FIG. 5A, regarding the first depth image 30a, the image grouping unit 130 divides the first depth image 30a into the second depth images 501~511 according to the substructures p1~p11 of the linking information of the object 200, for example, depth images corresponding to the head, the front arm or upper arm, the chest, the abdomen, the thigh or lower leg of the human body. Similarly, the image grouping unit 130 divides first depth images 30b and 30c into the second depth images 501~511 the according to the substructures p1~p11 of the linking information of the object 200. Then, as shown in FIG. 5B, taking the second depth image 501 (i.e. the depth image of the head of the object 200) as an example, the image grouping unit 130 takes the second depth images 501 of the first depth images 30a, 30b and 30c as a depth image group, and the other second depth images 502~511 can be deduced by analogy. In this way, the image grouping unit 130 generates the depth image groups 501s~511s on the substructures p1~p11.

The model building unit 140 is coupled to the image grouping unit 130. The model building unit 140 builds a local model corresponding to each of the substructures p1~p11 on the object 200 according to the second depth images 501~511 and the location information corresponding to each of the substructures p1~p11. Moreover, the model building unit 140 merges the local models corresponding to the substructures p1~p11 according to the linking information of the object 200, so as to build the 3D model of the object 200.

Figure 5C:
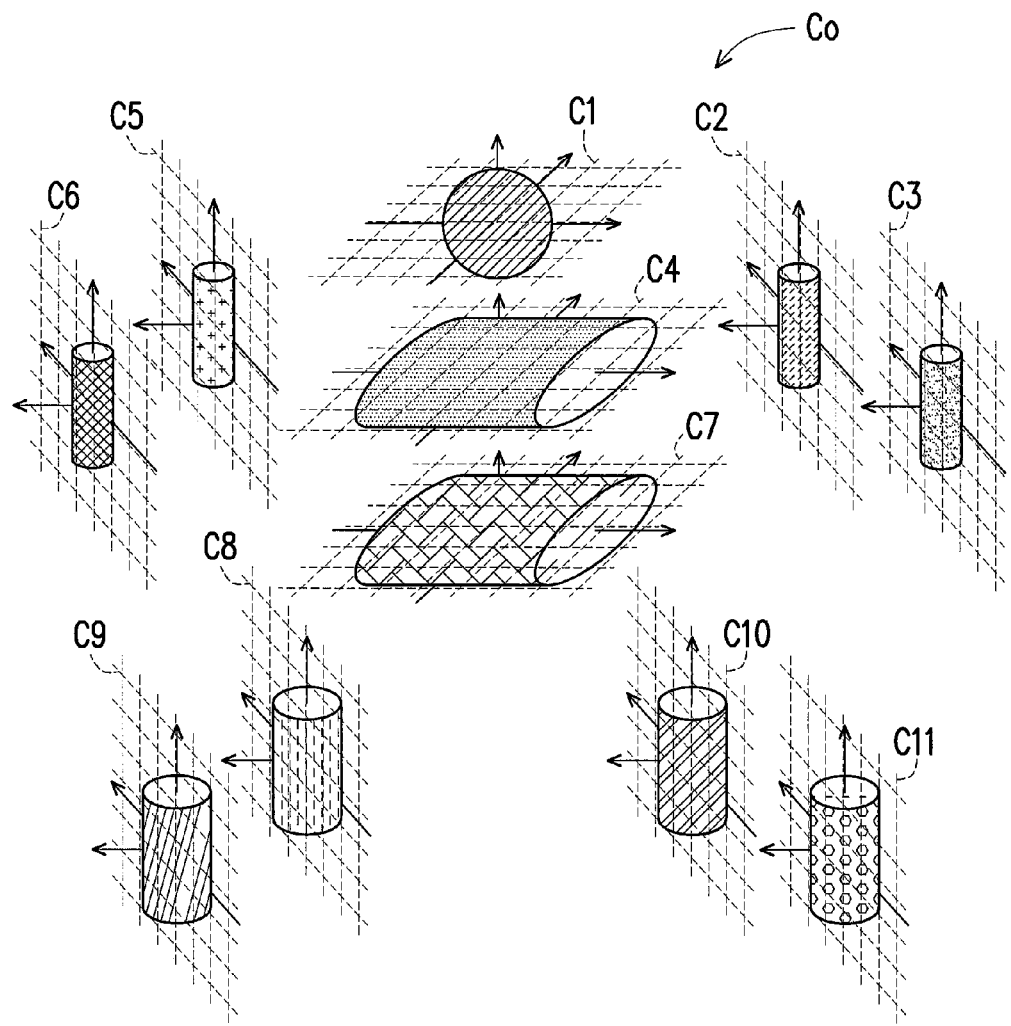
FIG. 5C is a schematic diagram illustrating a situation that a model building unit builds a local model corresponding to each substructure according to an exemplary embodiment of the disclosure.
Figure 5D:
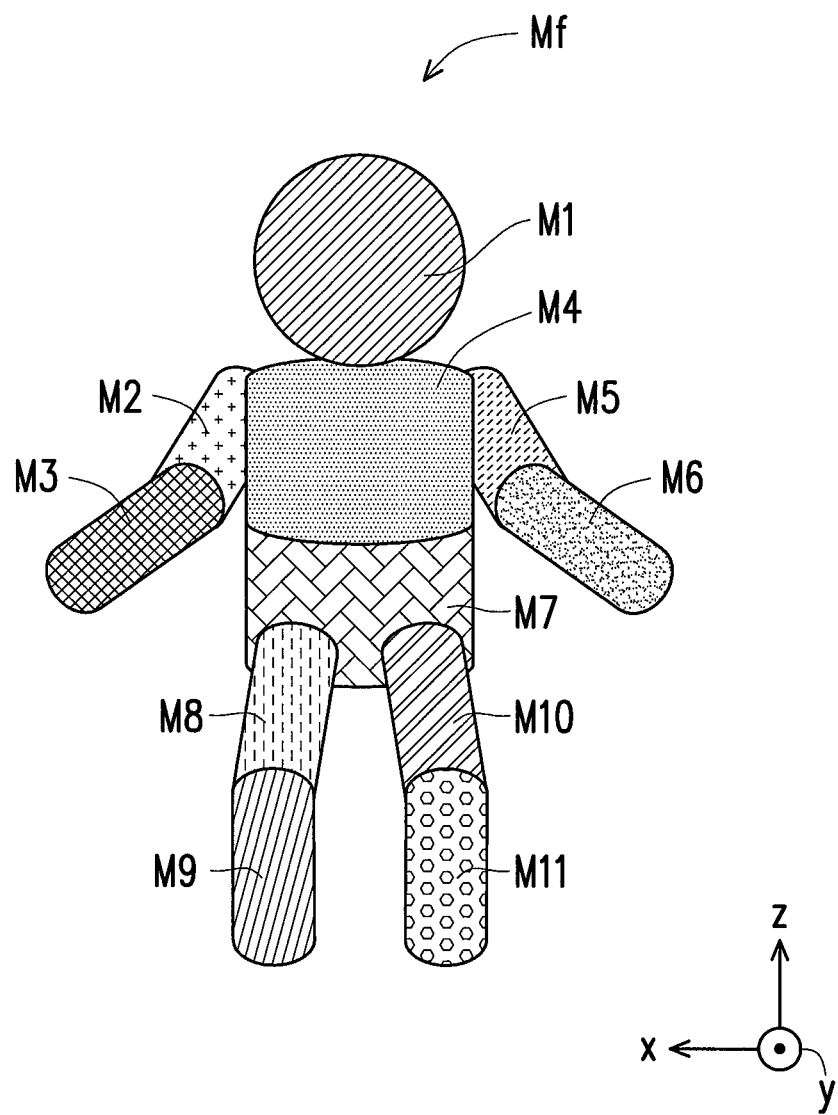
FIG. 5D is a schematic diagram illustrating a situation that a model building unit merges local models to build a 3D model of an object according to an exemplary embodiment of the disclosure.

FIG. 5C is a schematic diagram illustrating a situation that the model building unit 140 builds a local model corresponding to each of the substructures according to an exemplary embodiment of the disclosure. FIG. 5D is a schematic diagram illustrating a situation that the model building unit 140 merges the local models to build the 3D model of the object 200 according to an exemplary embodiment of the disclosure.

Referring to FIGS. 5B-5D, according to local coordinate systems C1~C11 of the substructures p1~p11 (shown in FIG. 4), the model building unit 140 obtains location information and orientation information of the microstructures in each of the substructures p1~p11 relative to the local coordinate systems C1~C11, and respectively generates local models M1~M11 of the object 200 according to the depth image groups 501s~511s corresponding to the substructures p1~p11. For example, it is also assumed that the object 200 is the human body, the local model M1 corresponds to the head, the local models M2~M3, M5~M6 correspond to the front arm and the upper arms, the local model M4 corresponds to the chest, the local model M7 corresponds to the abdomen, and the local models M8~M11 correspond to thighs and the lower legs.

Further, the 3D model reconstructing apparatus 10 of the present exemplary embodiment further selectively includes the coordinate transforming unit 150. The coordinate transforming unit 150 is coupled to the image grouping unit 130 and the model building unit 140. Here, the coordinate transforming unit 150 transforms the first coordinate information of each of the substructures from the global coordinate system Co of the object 200 to the local coordinate systems C1~C11 (for example, cylindrical coordinate systems) of the substructures p1~p11 through a transforming calculation, where the local coordinate systems C1~C11 correspond to the substructures p1~p11, and the substructures p1~p11 have the second coordinate information in the local coordinate systems C1~C11. Namely, the substructures p1~p11 of the object 200 respectively have their own local coordinate systems C1~C11, and each of the substructures p1~p11 have location information of the local coordinate systems C1~C11, which is referred to as second coordinate information.

According to another aspect, since the first depth images built by the depth unit 120 according to the shooting results provided by the image capturing unit 110 have the first coordinate information of the global coordinate system Co, and during the process that the image capturing unit 110 shoots the object 200, each of the substructures and the microstructures in each of the substructures can be regarded as a rigid body, namely, the appearance of each of the microstructures is not changed (for example, the appearance of the of the microstructures is not elongated, shortened or distorted) during the shooting process of the image capturing unit 110. Therefore, regarding the first depth image of the object 200 generated corresponding to each of the shooting angles, the 3D coordinate information of the pixels in the depth image can be stored according to the respective local coordinate system of each of the substructures of the object 200. In this way, the model building unit 140 can merge the depth image groups 501s~511s corresponding to the substructures p1~p11 according to the second coordinate information of the local coordinate systems C1~C11, so as to build the local models M1~M11 corresponding to each of the substructures p1~p11.

Moreover, when the model building unit 140 builds the local models M1~M11 corresponding to each of the substructures p1~p11, the model building unit 140 further determines whether each of the second depth images 501~511 in the depth image groups 501s~511s have an overlapped region. If the second depth images 501~511 have the overlapped region, the model building unit 140 excludes the overlapped region, and builds the local models according to remained depth images in the second depth images 501-511 excluding the overlapped region. For example, regarding the depth image group 501s of FIG. 5C, if the three second depth images 501 of the depth image group 501s have an overlapped region, the model building unit 140 excludes the overlapped region, and uses the remained depth images of the second depth images 501 excluding the overlapped region to build the local models M1~M11 of the object 200 in the substructure p1.

In detail, when the model building unit 140 builds the local models M1~M11 corresponding to the substructures p1~p11, each of the second depth images 501~511 in the depth image groups 501s~511s have an overlapped region, when the model building unit 140 merges the second depth images 501~511 in each of the depth image groups, the model building unit 140 adjusts a configuration of each of the second depth images 501~511 of the depth image groups 501s~511s on each of the local coordinate systems according to feature information of the object 200 on the surface of each of the substructures p1~p11, so as to build the local models M1~M11 corresponding to the substructures p1~p11. The feature information is, for example, a surface texture of the object 200, or a profile of the object 200, etc., which is not limited by the disclosure.

In other words, in order to ensure that each of the substructures p1~p11 accurately corresponds to each of the second depth images in each of the depth image groups, for example, the skeleton structure of the head (including a position and a direction of each skull) accurately corresponds to the depth image of the head, or the skeleton structure of the arm (including a position and direction of each hand bone) accurately corresponds to the depth image of the arm, etc., the model building unit 140 further finely adjusts the partial models M1~M11 according to the features of the surface texture or the profile, etc. of the object 200. In this way, the model building unit 140 can minimize the overlapped region between the second depth images in each of the depth image groups, so as to build the accurate local models M1~M11.

Figure 5E:
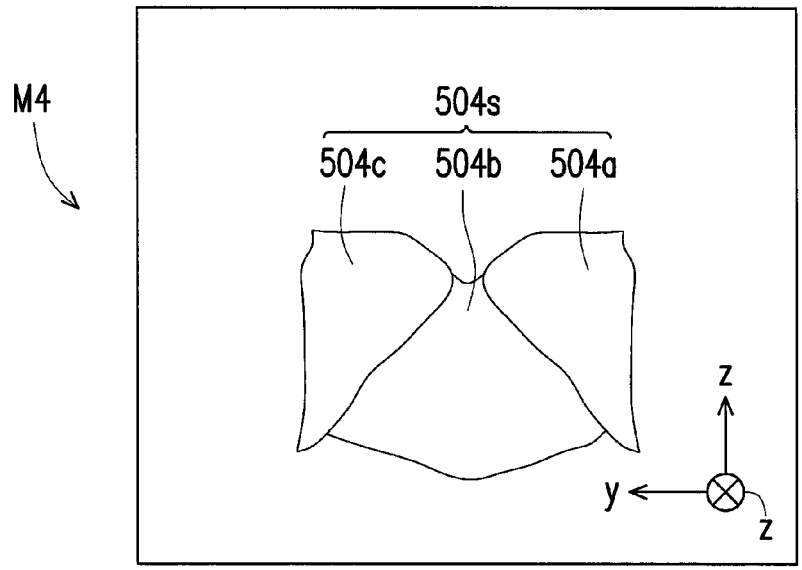
FIGS. 5E-5G are schematic diagrams of local models of an object built by a model building unit viewed from different viewing-angles according to an exemplary embodiment of the disclosure.
Figure 5F:
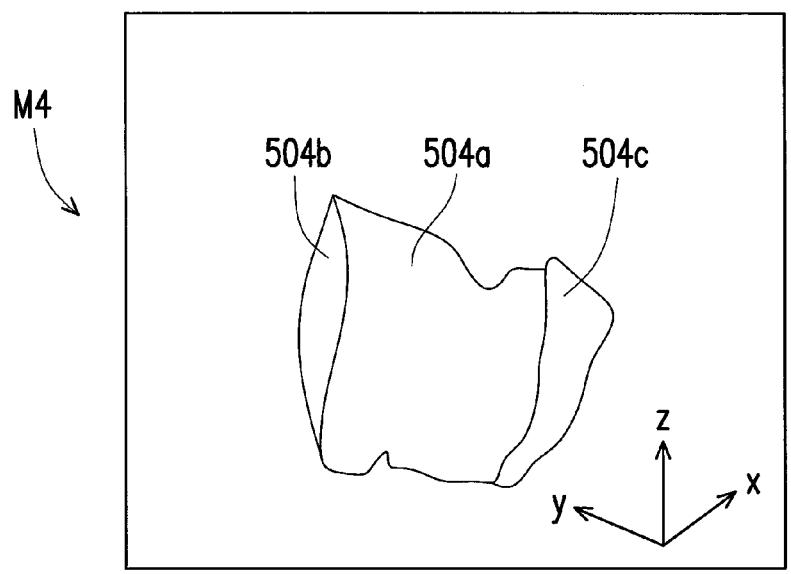
Figure 5G:
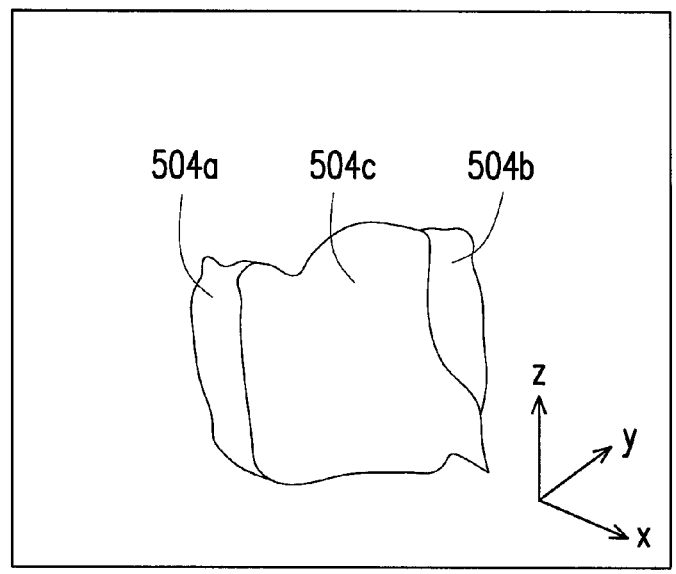

For example, FIGS. 5E-5G are schematic diagrams of local models of the object 200 built by the model building unit 140 viewed from different viewing-angles according to an exemplary embodiment of the disclosure. The local model M4 of the object 200 in FIG. 5D is taken as an example for descriptions, and the local model M4 is a chest model of the object 200. Referring to FIGS. 5E-5G, the local model M4 is generated by the model building unit 140 according to the depth image group 504s. As shown in FIGS. 5E-5G, the local model M4 can be composed of a second depth image 504a (coming from the first depth image 30a), a second depth image 504b (coming from the first depth image 30b), and a second depth image 504c (coming from the first depth image 30c).

Referring to FIG. 5D, after the model building unit 140 builds the local models M1~M11 corresponding to the substructures, the model building unit 140 further merges the local models M1~M11 on the local coordinate systems of the substructures according to the linking information of the object 200 to transform the local models M1~M11 of the substructures from the local coordinate systems to the global coordinate system Co of the object 200, so as to merge the local models M1~M11 corresponding to the substructures to build the 3D model of the object 200. Namely, the model building unit 140 transforms the depth image groups corresponding to the substructures from the local coordinate systems to the global coordinate system Co of the object 200 according to the second coordinate information of the substructures on the local coordinate systems, and merges the local models M1~M11 to generate a 3D model Mf of the integral object 200.

It should be noticed that, the model building unit 140 further merges the local models M1~M11 according to the connection relationship between the microstructures of each of the substructures. In detail, the model building unit 140 takes each pixel in the second depth image corresponding to each of the substructures as a point, and during a process that the model building unit 140 merges the local models M1~M11, and when three neighboring points are connected to another point, the model building unit 140 determines whether a first figure formed by the three neighboring points is overlapped with a second figure formed by two of the three neighboring points and the other point. In detail, the first figure and the second figure are, for example, respectively a triangle, the model building unit 140 takes a triangle formed by each point and two neighboring points as a unit for connection (i.e. form a plurality of triangles), and determines whether an overlapping phenomenon occurs between the connected triangles, i.e. checks whether the 3D planes represented by the triangles have spatial relationships of plane intersection and plane overlapping. If the 3D planes represented by the triangles have spatial relationships of plane intersection and plane overlapping, such connection relationship is incorrect, and the model building unit 140 selects another point to execute the above determination and check operations. If the overlapping phenomenon is not occurred, the model building unit 140 determines that the connection relationship between the checked three points is correct.

Figure 5H:
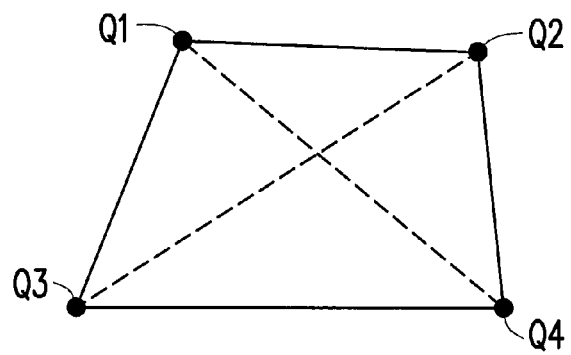
FIG. 5H is a schematic diagram of a connection relationship of a 3D model built by a model building unit according to an exemplary embodiment of the disclosure.

FIG. 5H is a schematic diagram of the connection relationship of the 3D model Mf built by the model building unit 140 according to an exemplary embodiment of the disclosure. Referring to FIG. 5H, the model building unit 140 determines whether the triangles formed by each three points in the points Q1-Q4 have the overlapping phenomenon. For example, regarding a triangle T1 formed by the point Q1 and the neighboring points Q3 and Q4, and a triangle T2 formed by the point Q2 and the neighboring points Q3 and Q4, since the overlapping phenomenon occurs between the triangle T1 and the triangle T2, the model building unit 140 determines that the connection relationship of the triangle T1 and the triangle T2 (i.e. the connection relationship of the points Q1, Q3 and Q4 and the connection relationship of the points Q2, Q3 and Q4) is incorrect.

On the other hand, regarding the triangle T1 formed by the point Q1 and the neighboring points Q3 and Q4, and a triangle T2' formed by the point Q2 and the neighboring points Q1 and Q4, the connection relationship of the triangle T1 and the triangle T2' (i.e. the connection relationship of the points Q1, Q3 and Q4 and the connection relationship of the points Q2, Q1 and Q4) is correct. In this way, the model building unit 140 checks whether a triangle formed by each three points is overlapped with the neighboring triangles until all of the points and the neighboring points have the connection relationships.

Moreover, in the present exemplary embodiment, the display unit 160 can be selectively configured for coupling to the model building unit 140. The display unit 160 can display the 3D model of the object 200 built by the model building unit 140. In this way, a user can view the accurate 3D model of the object 200 through the display unit 160.

According to the above descriptions, the 3D model reconstructing apparatus 10 of the present exemplary embodiment obtains shooting information of the object 200 in different angles through the image capturing unit 110, and generates a plurality of the first depth images 30a-30c of the object 200 through the depth unit 120. Moreover, the 3D model reconstructing apparatus 10 divides the first depth images 30a-30c into a plurality of depth image groups 501s~511s according to the linking information of the object 200. Particularly, the 3D model reconstructing apparatus 10 generates the local models M1~M11 according to the coordinate systems of the depth image groups 501s~511s. Finally, the 3D model reconstructing apparatus 10 merges the local models M1~M11 to generate the 3D model Mf of the object 200. In this way, according to the present exemplary embodiment, an accurate 3D model of a deformable object can be built through the image capturing unit 110.

Figure 6:
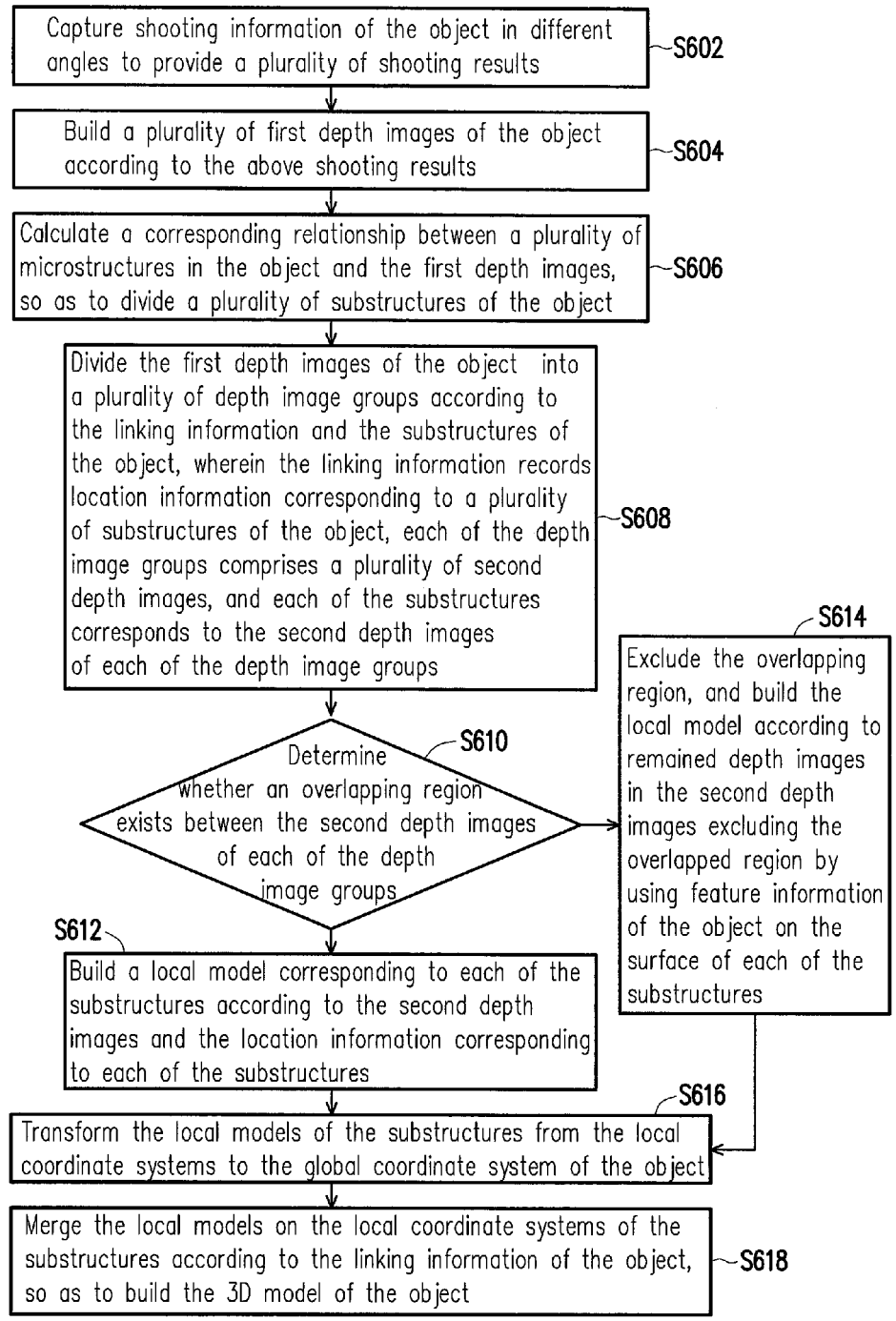
FIG. 6 is a flowchart illustrating a method for reconstructing a 3D model according to an exemplary embodiment of the disclosure.

FIG. 6 is a flowchart illustrating a method for reconstructing a 3D model according to an exemplary embodiment of the disclosure.

Referring to FIG. 6, in step S602, the image capturing unit 110 is used to capture shooting information of the object 200 in different angles to provide a plurality of shooting results. In step S604, the depth unit 120 builds a plurality of first depth images of the object 200 according to the shooting results provided by the image capturing unit 110, where the first depth image has depth information of the object 200.

In step S606, the structure recognizing unit 135 calculates a corresponding relationship between a plurality of microstructures in the object 200 and the first depth images according to linking information of the object 200, so as to divide a plurality of substructures of the object 200. Then, in step S608, the image grouping unit 130 divides the first depth images of the object 200 into a plurality of depth image groups according to the linking information and the substructures of the object 200, where the linking information records location information corresponding to a plurality of substructures of the object 200, each of the depth image groups comprises a plurality of second depth images, and each of the substructures corresponds to the second depth images of each of the depth image groups.

In step S610, the model building unit 140 determines whether an overlapping region exists between the second depth images of each of the depth image groups.

If the model building unit 140 determines that none overlapping region exists between the second depth images of each of the depth image groups, a step S612 is executed, by which the model building unit 140 builds a local model corresponding to each of the substructures according to the second depth images and the location information corresponding to each of the substructures.

However, if the model building unit 140 determines that the overlapping region exists between the second depth images of each of the depth image groups, a step S614 is executed, by which the model building unit 140 excludes the overlapping region, and builds the local model according to remained depth images in the second depth images excluding the overlapped region by using feature information of the object 200 on the surface of each of the substructures.

In step S616, the model building unit 140 transforms the local models of the substructures from the local coordinate systems to the global coordinate system of the object 200. Finally, in step S618, the model building unit 140 merges the local models on the local coordinate systems of the substructures according to the linking information of the object 200, so as to build the 3D model of the object 200.

In summary, according to the method for reconstructing a 3D model and the 3D model reconstructing apparatus of the disclosure, the first depth images of the object in different angles are divided into a plurality of depth image groups according to the linking information of the object, where each of the first depth image groups has a plurality of second depth images. Moreover, each of the depth image groups is transformed from the global coordinate system of the object to the respective local coordinate systems of the depth image groups, so as to generate the local model by using each of the depth image groups. Then, an integral 3D model of the object 200 is built by merging the local models. In this way, the 3D image of the deformable object is accurately built.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for reconstructing a three-dimensional model, adapted to build a three-dimensional model of an object, comprising:
   obtaining a plurality of first depth images of the object, wherein the object is a human body;
   dividing the first depth images of the object into a plurality of depth image groups according to linking information of the object, wherein the linking information records location information corresponding to a plurality of substructures of the object, each of the depth image groups comprises a plurality of second depth images, and each of the substructures corresponds to the second depth images of each of the depth image groups;
   building a local model corresponding to each of the substructures according to the second depth images and the location information corresponding to each of the substructures; and
   merging the local models corresponding to the substructures according to the linking information of the object, so as to build the three-dimensional model of the object,
   adjusting the local models according to the features of the surface of the object,
   wherein the step of merging the local models corresponding to the substructures according to the linking information of the object to build the three-dimensional model of the object further comprises:
      in a plurality of pixels in each of the second depth images corresponding to each of the substructures, when three neighboring pixels are connected to another pixel, determining whether a first figure formed by the three neighboring pixels is overlapped with a second figure formed by two of the three neighboring pixels and the other pixel;

when the first figure is overlapped with the second figure, determining a connection relationship between the three neighboring pixels and the other pixel to be incorrect; and when the first figure is not overlapped with the second figure, maintaining the connection between the three neighboring pixels and the other pixel.

2. The method for reconstructing the three-dimensional model as claimed in claim 1, wherein the step of dividing the first depth images of the object into the depth image groups according to the linking information of the object comprises:

dividing the substructures of the object according to a corresponding relationship between a plurality of pixels in the first depth images and a plurality of microstructures of the object.

3. The method for reconstructing the three-dimensional model as claimed in claim 1, wherein the location information respectively corresponding to the substructures has first coordinate information of each of the substructures, and the first coordinate information is obtained according to a global coordinate system of the object.

4. The method for reconstructing the three-dimensional model as claimed in claim 3, wherein the step of building the local model corresponding to each of the substructures according to the second depth images and the location information corresponding to each of the substructures comprises:

transforming the first coordinate information corresponding to each of the substructures and the second depth images corresponding to the substructures from the global coordinate system to a local coordinate system through a transforming calculation, wherein the local coordinate system corresponds to the substructure, and the substructure has second coordinate information in the local coordinate system.

5. The method for reconstructing the three-dimensional model as claimed in claim 4, wherein after the step of transforming the first coordinate information corresponding to each of the substructures and the second depth images corresponding to each of the substructures from the global coordinate system to the local coordinate system, the method further comprises:

obtaining location information and orientation information of at least one microstructure in each of the substructures relative to the local coordinate system according to the second coordinate information of the substructure.

6. The method for reconstructing the three-dimensional model as claimed in claim 4, wherein the step of merging the local models corresponding to the substructures according to the linking information of the object to build the three-dimensional model of the object comprises:

transforming the second coordinate information in the local model corresponding to each of the substructures from the local coordinate system to the global coordinate system of the object; and merging the local models of the substructures on the global coordinate system according to the linking information of the object, so as to build the three-dimensional model of the object.

7. The method for reconstructing the three-dimensional model as claimed in claim 1, wherein the step of building the local model corresponding to each of the substructures according to the second depth images and the location information corresponding to each of the substructures comprises:

obtaining an overlapping region between the second depth images in each of the depth image groups, and excluding the overlapping region to build the local model.

8. The method for reconstructing the three-dimensional model as claimed in claim 1, wherein the step of building the local model corresponding to each of the substructures according to the second depth images and the location information corresponding to each of the substructures further comprises:

building the local model according to feature information of the substructure.

9. The method for reconstructing the three-dimensional model as claimed in claim 1, further comprising displaying the three-dimensional model of the object.

10. A three-dimensional model reconstructing apparatus, adapted to build a three-dimensional model of an object, the three-dimensional model reconstructing apparatus comprising:

a camera, capturing shooting information of the object in different angles to provide a plurality of shooting results, wherein the object is a human body;

a processor electrically connected to the camera and configured to execute:

a depth unit to build a plurality of first depth images of the object according to the shooting results provided by the camera;

an image grouping unit to divide the first depth images of the object into a plurality of depth image groups according to linking information of the object, wherein the linking information records location information corresponding to a plurality of substructures of the object, each of the depth image groups comprises a plurality of second depth images, and each of the substructures corresponds to the second depth images of each of the depth image groups; and a model building unit to build a local model corresponding to each of the substructures according to the second depth images and the location information corresponding to each of the substructures, and merge the local models corresponding to the substructures according to the linking information of the object, so as to build the three-dimensional model of the object, and further adjust the local models according to the features of the surface of the object, wherein in a plurality of pixels in each of the second depth images corresponding to each of the substructures, when three neighboring pixels are connected to another pixel, the model building unit determines whether a first figure formed by the three neighboring pixels is overlapped with a second figure formed by two of the three neighboring pixels and the other pixel, when the first figure is overlapped with the second figure, the model building unit determines a connection relationship between the three neighboring pixels and the other pixel to be incorrect, and when the first figure is not overlapped with the second figure, the model building unit maintains the connection between the three neighboring pixels and the other pixel.

11. The three-dimensional model reconstructing apparatus as claimed in claim 10, wherein the processor is further configured to execute:

a structure recognizing unit to divide the substructures of the object according to a corresponding relationship between a plurality of pixels in the first depth images and a plurality of microstructures of the object.

12. The three-dimensional model reconstructing apparatus as claimed in claim 10, wherein the location information respectively corresponding to the substructures has first coordinate information of each of the substructures, and the first coordinate information is obtained according to a global coordinate system of the object.

13. The three-dimensional model reconstructing apparatus as claimed in claim 12, wherein the processor is further configured to execute:

a coordinate transforming unit to transform the first coordinate information corresponding to each of the substructures and the second depth images corresponding to the substructures from the global coordinate system to a local coordinate system through a transforming calculation, wherein the local coordinate system corresponds to the substructure, and the substructure has second coordinate information in the local coordinate system.

14. The three-dimensional model reconstructing apparatus as claimed in claim 13, wherein the model building unit obtains location information and orientation information of at least one microstructure in each of the substructures relative to the local coordinate system according to the second coordinate information of the substructure.

15. The three-dimensional model reconstructing apparatus as claimed in claim 13, wherein the model building unit transforms the second coordinate information in the local model corresponding to each of the substructures from the local coordinate system to the global coordinate system of the object, and merges the local models of the substructures on the global coordinate system according to the linking information of the object, so as to build the three-dimensional model of the object.

16. The three-dimensional model reconstructing apparatus as claimed in claim 10, wherein the model building unit obtains an overlapping region between the second depth images in each of the depth image groups, and excludes the overlapping region to build the local model.

17. The three-dimensional model reconstructing apparatus as claimed in claim 10, wherein the model building unit builds the local model according to feature information of the substructure.

18. The three-dimensional model reconstructing apparatus as claimed in claim 10, further comprising:

a display, coupled to the processor, and displaying the three-dimensional model of the object.

* * * * *